United States Patent
Sakai et al.

(10) Patent No.: US 6,480,466 B1
(45) Date of Patent: Nov. 12, 2002

(54) TERMINAL SWITCHING APPARATUS AND METHOD

(75) Inventors: Hikari Sakai, Hadano (JP); Takeo Kitsukawa, Sagamihara (JP); Hiroki Furuichi, Minamiashigara (JP); Akira Ando, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/215,278

(22) Filed: Dec. 18, 1998

(30) Foreign Application Priority Data

Dec. 22, 1997 (JP) .............................. 9-352671

(51) Int. Cl.[7] .............................................. H04J 15/00
(52) U.S. Cl. .......................................... 370/221; 714/5
(58) Field of Search ................................ 370/218, 219, 370/220, 221, 714; 714/4, 5, 10, 100; 709/201, 208, 209, 211, 212, 213; 345/2.1, 2.2

(56) References Cited

U.S. PATENT DOCUMENTS

| | | | | |
|---|---|---|---|---|
| 4,442,502 A | * | 4/1984 | Friend et al. ................ | 359/135 |
| 5,058,056 A | * | 10/1991 | Hammer et al. .............. | 714/10 |
| 5,247,615 A | * | 9/1993 | Mori et al. .................. | 370/258 |
| 5,347,271 A | * | 9/1994 | Iwasaki ....................... | 370/218 |
| 5,404,500 A | * | 4/1995 | Legvold et al. ................ | 714/6 |
| 5,437,014 A | * | 7/1995 | Busboom et al. ........... | 345/163 |
| 5,640,530 A | * | 6/1997 | Beardsley et al. ........... | 711/113 |
| 5,771,367 A | * | 6/1998 | Beardsley et al. .......... | 711/113 |
| 5,809,222 A | * | 9/1998 | Kizu et al. ................... | 709/208 |
| 5,974,114 A | * | 10/1999 | Blum et al. ................. | 370/217 |
| 6,298,376 B1 | * | 10/2001 | Rosner et al. .............. | 709/208 |

FOREIGN PATENT DOCUMENTS

JP 6-224914 8/1994

* cited by examiner

*Primary Examiner*—Melvin Marcelo
*Assistant Examiner*—Derrick W Ferris
(74) *Attorney, Agent, or Firm*—Mattingly, Stanger & Malur, P.C.

(57) ABSTRACT

A terminal switching apparatus is connected between an information processing apparatus and a plurality of operating terminals for performing on-line operations and at least one spare terminal used in place of an operating terminal at the time of a failure, and relays on-line data therebetween. The terminal switching apparatus includes storage devices provided for the operating terminals and spare terminal, respectively, for storing on-line data including real-time screen data of the operating terminals and the spare terminal, and a control section with which during an on-line processing, the on-line data is stored into the storage device and with which at the time of detection of a failure in an operating terminal, the contents of the storage device for the failing operating terminal are copied into the storage device for the spare terminal so that the spare terminal continues the on-line processing.

4 Claims, 3 Drawing Sheets

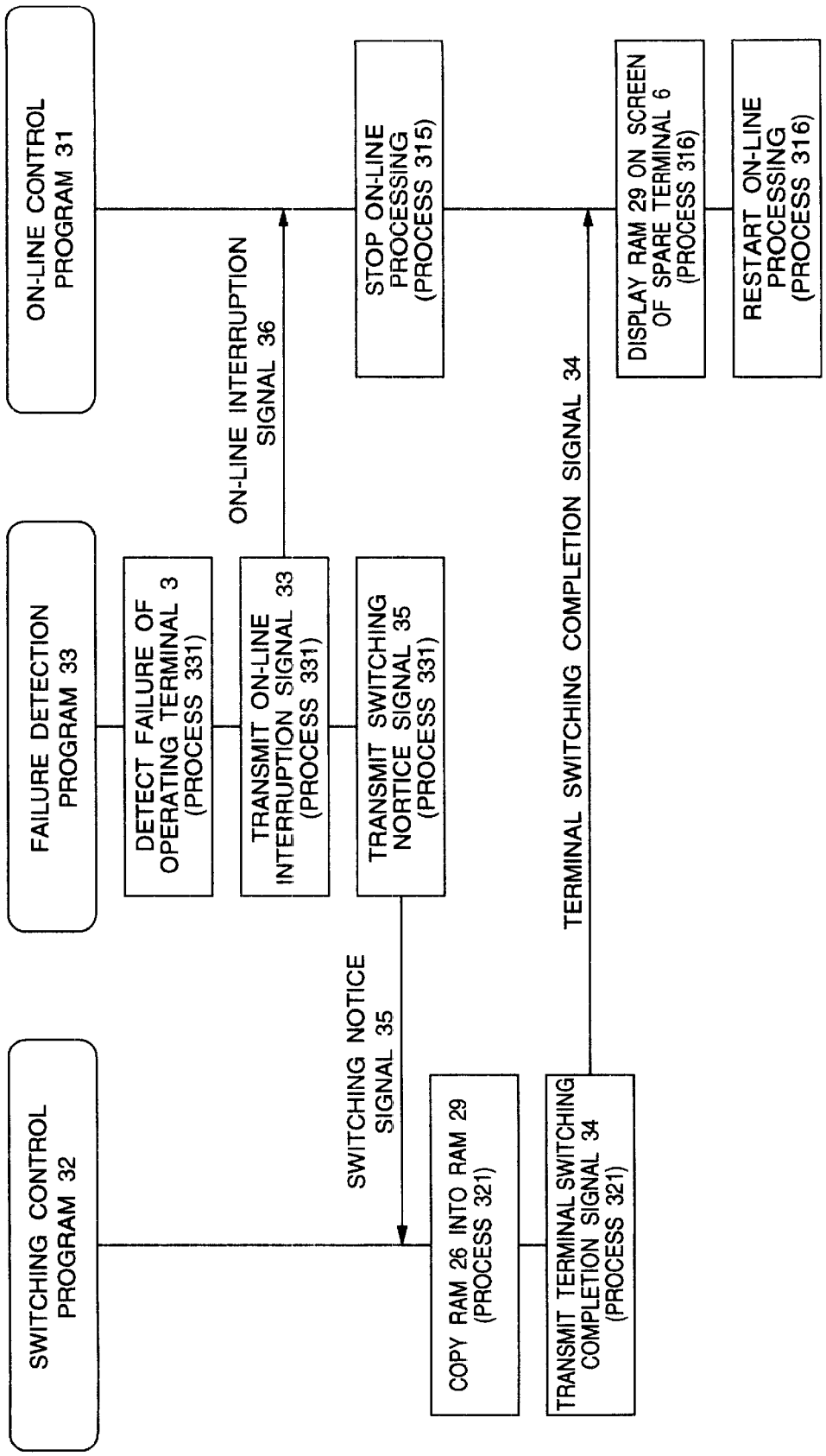

TERMINAL SWITCHING APPARATUS AND METHOD

BACKGROUND OF THE INVENTION

The present invention relates to a terminal equipment switching control technique, and more particularly to a terminal switching apparatus and method based on a terminal equipment switching control technique which is suitable for improving the operability and reliability at the time of generation of a terminal equipment failure by multiplexing terminal equipments.

The recent popularization of personal computers has exhibited the rapid increasing use of an ordinary general-purpose terminal equipment such as a personal computer as a terminal equipment coupled with a central processing unit or a server in an on-line manner. Merits of the use of a personal computer lie in that the cost of the personal computer itself is low and that network application software worldwidely popularized can be utilized as it is. However, though the cost of the personal computer is low, the shortening of the developing period or cycle of the personal computer results in that the reliability of the personal computer is low, in many cases, as compared with the conventional dedicated equipment for the exclusive use as a terminal.

Hitherto, a failure rate has been lowered by improving the reliability of a terminal equipment itself for exclusive use as an on-line terminal to reduce the influence of a failure of the terminal equipment on a service or work. However, a terminal equipment using a generally popularized low-cost personal computer has a high failure rate and is therefore considered as being unsuitable for an on-line processing in which an important service is performed.

Techniques relevant to the present invention include a technique disclosed by JP-A-6-224914. In the disclosed technique, a backup or monitor terminal and a terminal operation checking file for storing the operating conditions of service operating terminals are provided on the same network. The monitor terminal periodically monitors the terminal operation checking file to detect the abnormality of each service operating terminal. The monitor terminal takes over the service of an abnormal terminal. With this construction, it becomes possible to reduce the influence of a terminal failure on an on-line service, that is, it becomes possible to make a low-reliability terminal adaptable as an on-line terminal.

According to such a technique, each terminal equipment has a need for incorporation of a dedicated processing for storing the normality of that terminal equipment into the file on an on-line network. When the operation/maintenance is taken into consideration, the above requisition makes the cost high in the case where the number of terminal equipments is large. Further, since the monitoring of the condition of communication and on-line transmit/receive data between the terminal and a host computer and the monitoring of data being inputted by an operator into a display screen are not possible, there is a possibility that when a console exchange occurs, the on-line data has an omission or the data being inputted by the operator is erased. For example, in the case where a certain terminal equipment is switched to a spare terminal as the result of generation of a failure in that terminal equipment when the host computer is transferring an important message to that terminal equipment, there is a possibility that the message is not normally transferred to the spare terminal. In such a case, it is not possible to inform an operator of the message even if the switching to the spare terminal is made.

SUMMARY OF THE INVENTION

An object of the present invention is to provide a technique with which at the time of generation of a failure in any one of plural terminal equipments connected to a host computer in an on-line manner, the switching to a spare terminal equipment is performed smoothly with no influence on a service while ensuring on-line data handled between the host computer and the faulty terminal equipment or data operated by an operator, whereby low-cost terminal equipments are made adaptable as terminal equipments for on-line service even if the reliability of each terminal equipment is low.

In a terminal switching system according to the present invention, a terminal switching apparatus is provided on an on-line network between an information processing apparatus as a system body and terminal equipments which are under the control of the terminal switching apparatus and are made as the objects of switching. The terminal switching apparatus includes a screen data storage memory for each terminal equipment in which screen data, input data, cursor position and mouse position are stored, an on-line data storage memory for each terminal equipment in which on-line transmit/receive data between that terminal equipment and the information processing apparatus is stored, an on-line control section for performing an on-line control, a terminal failure detection section for detecting the abnormality of each terminal equipment, and a switching control section for performing the switching between the terminal equipments. In the case where the terminal failure detection section detects the generation of a failure in any one of the terminal equipments, the switching control section copies the contents of the screen data storage memory and the on-line data storage memory for the terminal equipment with the failure into the screen data storage memory and the on-line data storage memory for a spare terminal equipment and disconnects the faulty operating terminal from operation so that an on-line processing is started with the spare terminal equipment used as an operating terminal equipment, thereby enabling the switching from the faulty operating terminal to the spare terminal equipment while taking over the screen data, on-line data and so forth of the operating terminal equipment immediately before the generation of the failure.

In the case where an operator is performing an on-line processing for the information processing apparatus by use of an operating terminal equipment in an on-line system to which the terminal switching apparatus according to the present invention is applied, screen data, cursor position, input characters, mouse position and so forth handled by the operator are continually preserved in the screen data storage memory. Also, on-line data transmitted from the operating terminal equipment to the information processing apparatus is once stored into the on-line data storage memory of the terminal switching apparatus and is preserved therein until the transmission from the terminal switching apparatus to the information processing apparatus is normally completed. Similarly, on-line data received by the operating terminal equipment from the information processing apparatus is once stored into the on-line data storage memory of the terminal switching apparatus and is preserved therein until the transmission from the terminal switching apparatus to the operating terminal equipment is normally completed.

In the case where any failure is generated in an operating terminal equipment which is being operated by the operator, the terminal failure detection section of the terminal switching apparatus detects the abnormality of that terminal equipment by means of the ceasing of a polling to the terminal equipment, the detection of abnormality in receive data from the terminal equipment, the detection of abnormality in transmit data to the terminal equipment, and so forth. The failure detection section informs the switching control section of the detection of the abnormality. Then, the switching control section displays the contents of the screen data storage memory for the abnormal operating terminal equipment on the spare terminal equipment and transmits the contents of the on-line data storage memory for the abnormal operating terminal equipment to the spare terminal equipment. Thereby, it becomes possible to perform the terminal switching while the contents of input operation by the operator and the contents of on-line transmit/receive data in the faulty operating terminal equipment are taken over to the spare terminal equipment as they are.

With the above construction, the operator is enabled, after the generation of the failure in the terminal equipment under operation, to restart the operation by use of the spare terminal equipment while screen data and on-line data before the generation of the failure are taken over as they are. Also, it is possible to prevent the influence of the terminal failure on an on-line service. According to the present invention, an on-line service using the on-line coupling of terminal equipments to an information processing apparatus as a system body or a server can be operated with no need of the provision of specific high-reliability dedicated terminal equipments and thereinstead by use of the multiple provision of low-cost general-purpose terminal equipments with no hindrance to the service.

BRIEF DESCRIPTION OF THE DRAWINGS

FIG. 3 is a flow chart showing the operation of an embodiment of the present invention.

DESCRIPTION OF THE PREFERRED EMBODIMENTS

Embodiments of the present invention will now be described using the drawings.

Figure 1:
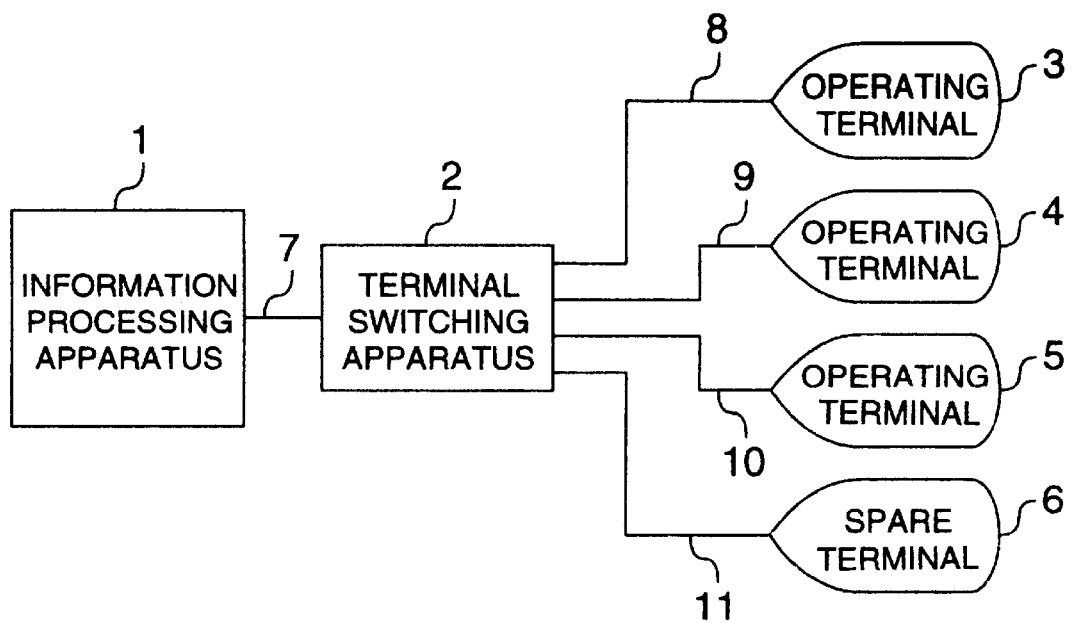
FIG. 1 is a block diagram of a system to which the present invention is applied.

FIG. 1 is a block diagram of a system in which an apparatus applied with a terminal switching system according to the present invention and operated by three operating terminals and one spare terminal is arranged on an on-line network.

In FIG. 1, reference numeral 1 denotes an information processing apparatus as a system body, numeral 2 a terminal switching apparatus to which a terminal switching system according to the present invention is applied, numerals 3, 4 and 5 operating terminals used for ordinary service operations, and numeral 6 a spare terminal for the operating terminals. The terminal switching apparatus 2 performs the transfer of on-line data for the information processing apparatus 1 through an on-line transmission path 7. The operating terminals 3 to 5 and the spare terminal 6 perform the transfer of on-line data for the terminal switching apparatus 2 through on-line transmission paths 8 to 11, respectively. The terminal switching apparatus 2 relays the on-line data. Thereby, the transmission/reception of on-line data is performed between the information processing apparatus 1 and the terminals 3 to 6.

Figure 2:
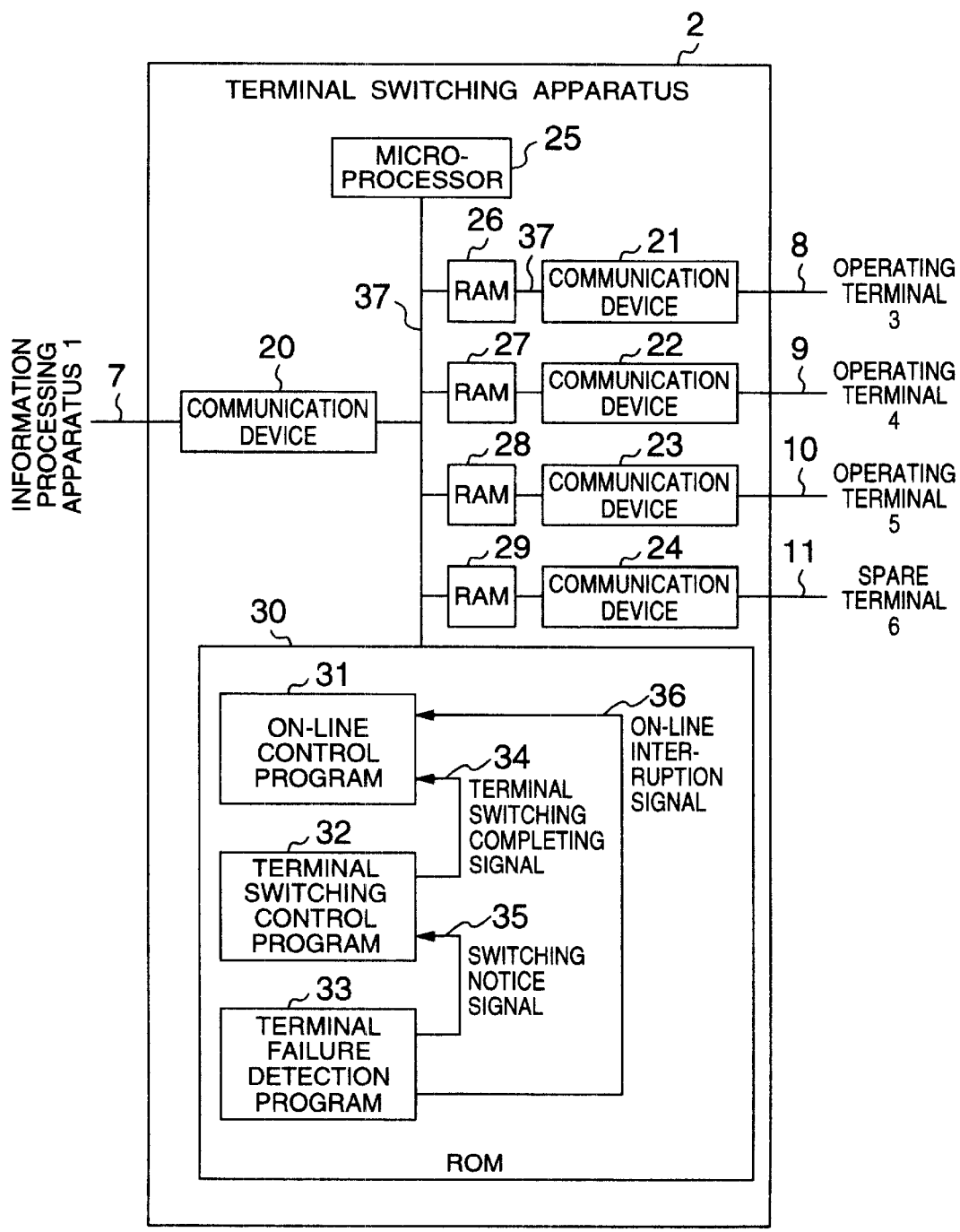
FIG. 2 is a block diagram of a terminal switching apparatus according to the present invention.

FIG. 2 is a block diagram showing the internal construction of the terminal switching apparatus 2 (FIG. 1) according to the present invention.

Referring to FIG. 2, a communication device 20 is connected to the on-line transmission path (FIG. 1) to the information processing apparatus 1, communication devices 21 and 23 are respectively connected to the on-line transmission paths 8 to 10 (FIG. 1) to the operating terminals 3 to 5, and a communication device 24 is connected to the on-line transmission path 11 (FIG. 1) to the spare terminal 6. The communication devices 20 to 24 are coupled to RAM's 26 to 29 through an internal bus 37 processed by a microprocessor 25.

Each of the RAM's 26 to 29 is divided into two areas (not shown) so that screen data, cursor position, input characters, mouse position and so forth handled by an operator are stored in one area or a screen data storage area while on-line data transmitted from the operating terminals 3 to 5 (and the spare terminal 6) to the information processing apparatus 1 is stored in the other area or an on-line data storage area.

A ROM 30 is coupled to the internal bus 37. The ROM 30 is stored with an on-line control program 31 for controlling the transmission/reception of on-line data between each terminal and the information processing apparatus, a terminal switching control program 32 for controlling the switching of the operating terminal to the spare terminal, and a terminal failure detection program 33 for detecting the abnormality of each of the operating terminals and the spare terminal. A failure detecting method in the present example includes an incorporated processing with which an instruction for delivery of a response request command used in a general communication protocol is issued for the communication devices 21 to 24 and an acknowledgement response from each terminal is received as a response to the response request command to judge the corresponding terminal equipment as being normal. After the lapse of a fixed time, the same processing is performed again. In the case where there is no acknowledgement response, it is determined that an abnormality is generated in the corresponding terminal equipment.

The terminal failure detection based on such polling reception as well as the detection of a terminal failure based on the abnormality of receive data from a terminal equipment, the abnormality of transmit data to a terminal equipment or the like are possible.

A terminal switching completion signal 34 is a signal by which the terminal switching control program 32 informs the on-line control program 31 of the completion of terminal switching. A switching notice signal 35 is a signal by which the terminal failure detection program 33 informs the terminal switching control program 32 of an instruction for switching start. An on-line interruption signal 36 is a signal by which the terminal failure detection program 36 informs the on-line control program 31 of the interruption of an on-line processing.

Next, the operation or processing for each signal processing pattern will be described using FIGS. 1 to 3. FIG. 3 shows the flow of a control at the time of generation of a terminal failure.

In the case where an operator is performing an on-line service for the information processing apparatus 1 by use of the operating terminal 3, the switching control program 32 and the terminal failure detection program 33 perform the respective processings as mentioned in the following.

First, the description will be made of the processing performed by the on-line control program 31 (FIG. 2).

Process 311: a processing in the case where on-line data is transferred from the information processing apparatus 1 to the operating terminal 3.

The on-line data is once stored into the RAM 26 (FIG. 2) through the communication device 20 (FIG. 1) and the stored on-line data is transmitted to the operating terminal 3 through the communication device 21 (FIG. 2). The on-line data stored in the RAM 26 (FIG. 2) is reserved under the control of the microprocessor 25 until the transmission is completed.

Process 312: a processing in the case where on-line data is transmitted from the operating terminal 3 to the information processing apparatus 1.

The on-line data is once stored into the RAM 26 (FIG. 2) through the communication device 21 (FIG. 1) and the stored on-line data is transmitted to the information processing apparatus 1 through the communication device 20 (FIG. 2). In this case too, the on-line data is stored in the RAM 26 until the transmission to the information processing apparatus 1 is completed.

Process 313: a processing in the case where an on-line screen is displayed on the operating terminal 3.

A screen display request is received as on-line data from the information processing apparatus 1 to store screen data into the RAM 26 (FIG. 2) and the data is transmitted to the operating terminal 3 through the communication device 21 to display an on-line screen on the operating terminal 3. In this case too, the screen data is backed up by the RAM 26 until the transmission is completed.

Process 314: a processing in the case where the operator inputs data to the operating terminal 3.

Data inputted onto the display screen of the operating terminal 3 by the operator is stored into the RAM 26 (FIG. 2) through the communication device 21 (FIG. 2) in units of one cursor input or one mouse click.

Process 315: a processing in the case where an on-line interruption signal 36 is received from the failure detection program 33.

The microprocessor 25 stops the on-line processing for the operating terminal 3.

Process 316: a processing in the case where a terminal switching completion signal 34 is received from the switching control program 32.

On the basis of screen data, cursor position and on-line data stored in the RAM 29 (FIG. 2) in which the contents of the RAM 26 are copied, as mentioned later on in conjunction with the processing performed by the switching control program 32, the screen data is displayed on the spare terminal 6 while an on-line processing for the spare terminal 6 is started.

Next, the description will be made of the processing performed by the switching control program 32 (FIG. 2).

Process 321: a processing in the case where a switching notice signal 35 is received from the terminal failure detection program 33 (FIG. 2).

Screen data, cursor position and on-line transmit/receive data stored in the RAM 26 (FIG. 2) are copied into the RAM 29 (FIG. 2) and the switching from the operating terminal 3 to the spare terminal 6 is made so that the spare terminal 6 turns to an operating terminal. And, a terminal switching completion signal 34 is transmitted to the on-line control program 31.

Next, the description will be made of the processing performed by the terminal failure detection program 33 (FIG. 2).

Process 331: a processing in the case where a failure in the operating terminal 3 is detected by the above-mentioned failure detecting means.

An on-line interruption signal 36 is transmitted to the on-line control program 31 and a switching notice signal 35 is transmitted to the switching control program 32.

Now suppose in FIG. 2 the case where any failure is generated in the operating terminal 3 when the operator is operating the operating terminal 3. In this case, the failure detection program 33 detects the failure of the terminal equipment 3 and transmits an on-line interruption signal 36 to the on-line control program 31 and a switching notice signal 35 to the switching control program 32 (process 331). When the on-line interruption signal 36 is received, the on-line control program 31 stops the on-line processing for the operating terminal 3 (FIG. 1) (process 315). When the switching notice signal 35 is received, the switching control program 32 copies the contents of the RAM 26 or screen data and on-line data of the operating terminal 3 (FIG. 1) into the RAM 29 and then transmits a terminal switching completion signal 34 to the on-line control program 31 (process 321). When the terminal switching completion signal 34 is received, the on-line control program 31 uses the spare terminal 6 as an operating terminal to display screen data before the generation of the failure which is stored in the RAM 29 and to restart the transmission/reception of on-line data (process 316).

With the above construction, the present embodiment provides the following effects.

(1) The operator having performed the on-line service by use of the operating terminal 3 (FIG. 1) is enabled to perform the on-line service continuously by use of the spare terminal 6 (FIG. 1) after the generation of a failure in the operating terminal 3.

(2) In connection with the above item (1), display data and input data of the operating terminal 3 are taken over to the screen of the spare terminal 6 after terminal switching as they are.

(3) In connection with the above item (1), in the case where a failure is generated in the operating terminal 3 during the transmission of on-line data from the terminal switching apparatus 2 (FIG. 1) to the operating terminal 3 and the terminal switching is made, the on-line data is preserved in the RAM 26 (FIG. 2) and this data is sent to the RAM 29 for the spare terminal 6 to continue the processing. As a result, there is no influence on the on-line processing of the information processing apparatus 1 (FIG. 1).

With the above-mentioned construction in which a terminal switching apparatus of the present embodiment is connected on an on-line network and an operating terminal equipment and a spare terminal equipment are provided, the operation switching to the spare terminal at the time of generation of a failure in the operating terminal can be performed with no influence on an on-line service or operation, thereby realizing the improvement of the reliability of the whole system. Also, with the construction of the present invention, it becomes possible to utilize a general-purpose terminal equipment such as a general personal computer as an on-line terminal equipment without worrying about the deterioration in reliability of the terminal equipment.

What is claimed is:

1. A terminal switching apparatus which is connected between an information processing apparatus and a plurality of operating terminals for performing ordinary on-line operations and at least one spare terminal used in place of an operating terminal at the time of generation of a failure in the operating terminal, and which relays on-line data between said information processing apparatus and said plurality of operating terminals and said at least one spare terminal, the terminal switching apparatus comprising:

a plurality of storage means provided for said plurality of operating terminals and said at least one spare terminal, respectively, for storing on-line data including real-time screen data of said operating terminals and said spare terminal; and a control section with which during an on-line processing, said on-line data is stored into said storage means and with which at the time of detection of a failure in an operating terminal, the contents of the storage means corresponding to the operating terminal having the failure are copied into the storage means corresponding to said spare terminal so that said spare terminal is caused to continue the on-line processing;

wherein said control section includes:

on-line control means which during an on-line processing between said information processing apparatus and any one of said plurality of operating terminals, performs the on-line processing while storing on-line data until the completion of the on-line processing into the storage means corresponding to the one operating terminal;

failure detection means which detects a failure of each of said operating terminals and which at the time of detection of the failure, outputs an on-line interruption signal to said on-line control means to interrupt said on-line processing and outputs an operating terminal switching notice signal; and switching control means which receives said switching notice signal to copy on-line data stored in the storage means corresponding to the operating terminal having the failure into the storage means corresponding to said spare terminal, said switching control means outputting a terminal switching completion signal to said on-line control means;

said on-line control means receiving said terminal switching completion signal to perform an on-line processing between said spare terminal and said information processing apparatus on the basis of the on-line data copied in the storage means corresponding to said spare terminal.

2. A terminal switching apparatus according to claim 1, wherein said failure detection means detects the failure of each operating terminal on the basis of a polling detection.

3. A terminal switching apparatus according to claim 1, wherein said failure detection means detects the failure of each operating terminal on the basis of the abnormality of transmit/receive data for the operating terminal.

4. A terminal switching apparatus according to claim 1, wherein said on-line data includes real-time data inclusive of at least screen data, input data, cursor position and mouse position of the operating terminal and said real-time data is displayed on a screen of said spare terminal.

* * * * *